United States Patent
Lee et al.

(10) Patent No.: US 9,692,532 B2
(45) Date of Patent: Jun. 27, 2017

(54) METHOD AND WIRELESS COMMUNICATION DEVICE FOR ANTENNA DEPLOYMENT DETERMINATION

(71) Applicant: MEDIATEK INC., Hsin-Chu (TW)

(72) Inventors: Yu-Ju Lee, Miaoli County (TW); Cheng-Lung Tsai, Chiayi County (TW); Hao-Sheng Hsu, Hsinchu County (TW); Hui-Kuang Tseng, Yunlin County (TW)

(73) Assignee: MEDIATEK INC., Hsin-Chu (TW)

( * ) Notice: Subject to any disclaimer, the term of this patent is extended or adjusted under 35 U.S.C. 154(b) by 370 days.

(21) Appl. No.: 13/666,991

(22) Filed: Nov. 2, 2012

(65) Prior Publication Data
US 2013/0210368 A1 Aug. 15, 2013

Related U.S. Application Data

(60) Provisional application No. 61/597,186, filed on Feb. 10, 2012.

(51) Int. Cl.
*H04B 17/00* (2015.01)
*H04B 17/318* (2015.01)
*H04B 17/10* (2015.01)

(52) U.S. Cl.
CPC ......... *H04B 17/318* (2015.01); *H04B 17/102* (2015.01)

(58) Field of Classification Search
CPC ...... H04W 24/00; H04W 24/02; H04W 24/04
USPC .................................. 455/67.11, 575.7, 115.3
See application file for complete search history.

(56) References Cited

U.S. PATENT DOCUMENTS

| | | | | |
|---|---|---|---|---|
| 5,617,102 A * | 4/1997 | Prater | ..................... | H01Q 1/22 342/374 |
| 6,128,470 A * | 10/2000 | Naidu | .................. | H04B 7/0802 455/14 |
| 6,339,404 B1 * | 1/2002 | Johnson | .................. | H01Q 1/243 343/700 MS |
| 7,353,012 B2 * | 4/2008 | Miyano | ................ | H04B 1/0064 455/140 |
| 7,800,553 B2 * | 9/2010 | Konaka | ..................... | H04B 1/48 343/876 |
| 7,937,052 B2 * | 5/2011 | Banh | ..................... | H04B 7/0868 455/140 |
| 8,675,762 B2 * | 3/2014 | Cheng | .................. | H04B 7/0456 375/259 |
| 2006/0025081 A1 * | 2/2006 | Zolfaghari | ............... | H04B 1/40 455/69 |
| 2007/0026827 A1 * | 2/2007 | Miyano | ................ | H04B 1/0064 455/132 |
| 2007/0093282 A1 * | 4/2007 | Chang | .................. | H04B 7/0608 455/575.7 |
| 2009/0131111 A1 * | 5/2009 | Joles | ..................... | H04W 24/02 455/562.1 |

(Continued)

*Primary Examiner* — April G Gonzales
(74) *Attorney, Agent, or Firm* — McClure, Qualey & Rodack, LLP

(57) ABSTRACT

A method of antenna deployment determination in a wireless communication device is disclosed. The method includes transceiving a radio signal via the a first antenna port of the wireless communication device, obtaining a first strength result corresponding to the radio signal transmitted or received via the first antenna port, and determining a connecting status of the first antenna port according to the first strength result.

14 Claims, 11 Drawing Sheets

(56) References Cited

U.S. PATENT DOCUMENTS

2010/0120415 A1* 5/2010 Urquhart .............. H01Q 1/1257
455/424
2010/0311339 A1* 12/2010 Chung ................. H04B 1/0053
455/41.3

* cited by examiner

METHOD AND WIRELESS COMMUNICATION DEVICE FOR ANTENNA DEPLOYMENT DETERMINATION

BACKGROUND

The present invention relates to a method and a wireless communication device for an antenna deployment determination, and more particularly, to a method and a wireless communication device that can correctly determine how many antennas are attached thereto.

Nowadays many wireless communication devices include multiple antennas for wireless transmission and reception. For example, a wireless communication system supporting a multiple-input multiple-output (MIMO) technology may use multiple antennas for wireless signal transmission and reception. Therefore, vendors of wireless communication devices usually manufacture products, such as smart phones or laptops, with several antenna ports for various applications, e.g., radio signals transceiving in Universal Mobile Communication System (UMTS)/Long Term Evolution (LTE) system or radio signals reception in global navigation satellite systems (GNSS). For example, a wireless communication device supporting 8×8 MIMO may have 8 antenna ports, such that up to 8 antennas can be attached to the wireless communication device. If the wireless communication device is to be operated in a 4×4 MIMO environment, only 4 antennas are needed. Therefore, 4 antenna ports have antennas attached, while the other 4 antenna ports do not. Such design provides flexibility for vendors/customers to develop wireless communication products.

Known method of determining how many antennas are attached to the wireless communication device is to utilize a hardware component. However, the method of utilizing an additional hardware component to determine how many antennas are attached to the wireless communication device will raise the hardware construction cost. Besides, a specific hardware device would fail to correctly determine how many antennas are attached to the wireless communication device due to different reasons, e.g. antenna types or external environments. In such a situation, the specific hardware needs to be replaced with another hardware that can appropriately determine how many antennas are attached to the wireless communication device. For the above reasons, determination of how many antennas are attached to the wireless communication device by a hardware device is cost-ineffective.

SUMMARY

Therefore, the primary objective of the present invention is to provide a method and a wireless communication device for determining how many antennas are attached thereto.

The present invention discloses a method of antenna deployment determination in a wireless communication device having at least an antenna port, the method comprising performing transceiving a radio signal via the a first antenna port of the wireless communication device; obtaining a first strength result corresponding to the radio signal transmitted or received via the first antenna port; and determining a connecting status of the first antenna port according to the first strength result.

The present invention further discloses a wireless communication device comprising a first antenna port; a processing unit, for executing a program code; and a data storage unit, for storing the program code; wherein the program code instructs the processing unit to execute the following steps as transceiving a radio signal via the first antenna port; obtaining a strength result corresponding to the radio signal transmitted or received via the first antenna port; and determining a connecting status of the first antenna port according to the first strength result.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in sub-module. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1A:
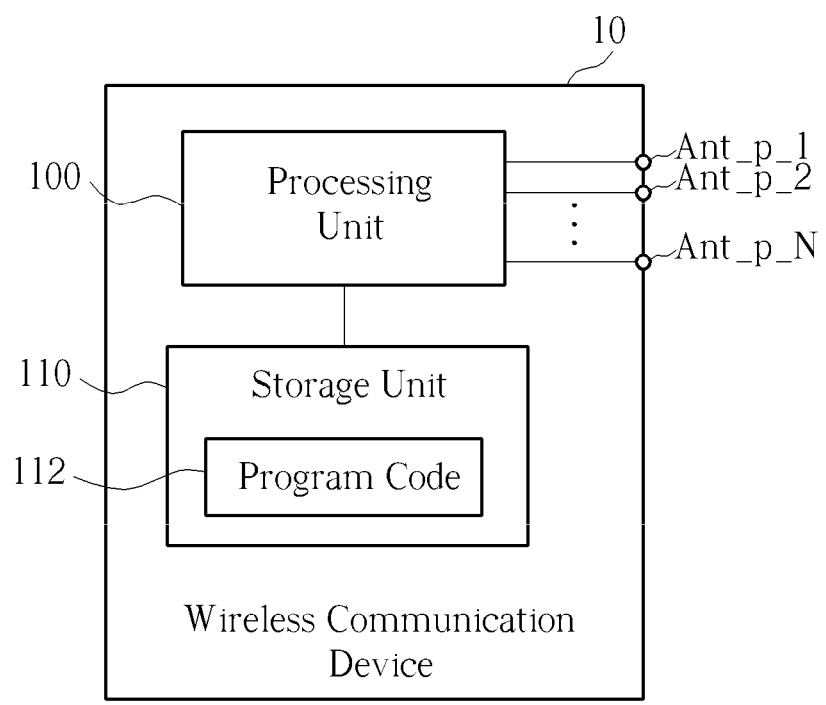
FIG. 1A and FIG. 1B are schematic diagrams of a wireless communication device according to an embodiment of the invention.
Figure 1B:
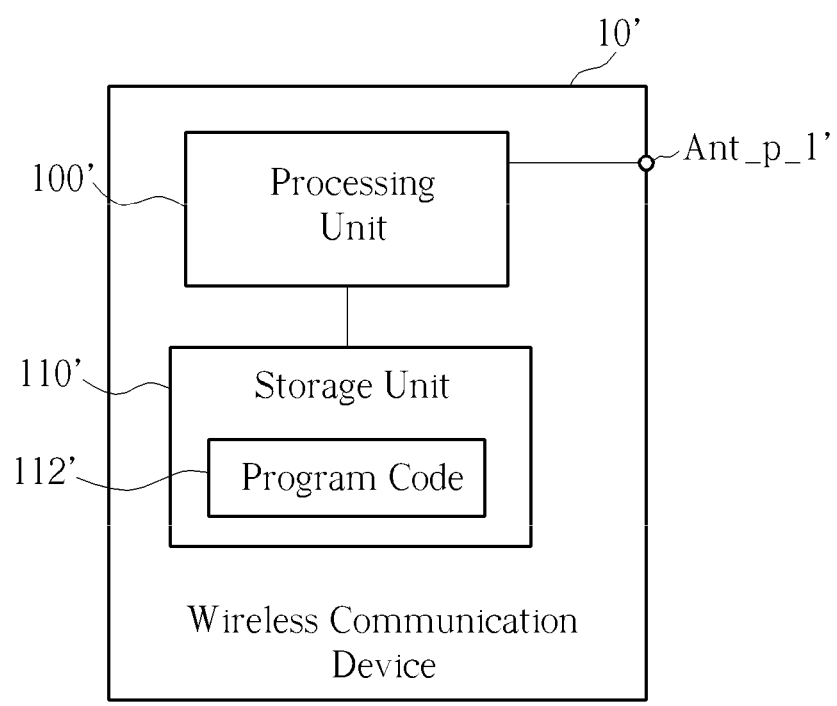

Please refer to FIG. 1A and FIG. 1B, which are schematic diagrams of the wireless communication device 10, 10' according to an embodiment of the invention. The wireless communication device 10 in FIG. 1A includes a processing unit 100, a storage unit 110 and antenna ports Ant_p_1-Ant_p_N, while the wireless communication device 10' in FIG. 1B includes a processing unit 100', a storage unit 110' and an antenna port Ant_p_1'. The processing unit 100 and 100' execute program codes 112 and 112' stored in the storage units 110 and 110' for controlling the antenna ports Ant_p_1-Ant_p_N and Ant_p_1'. Noticeably, the embodiment of the invention demonstrates examples with N antenna ports and one antenna port hereinafter, and those skilled in the art can adaptively modify the number of the antenna ports for different requirements. In simple, the embodiments of the invention hereinafter will discuss the cases with only one antenna port Ant_p-1' and two antenna ports Ant_p-1-Ant_p-2 in the following paragraphs, which is not limiting the scope of the invention.

Figure 2:
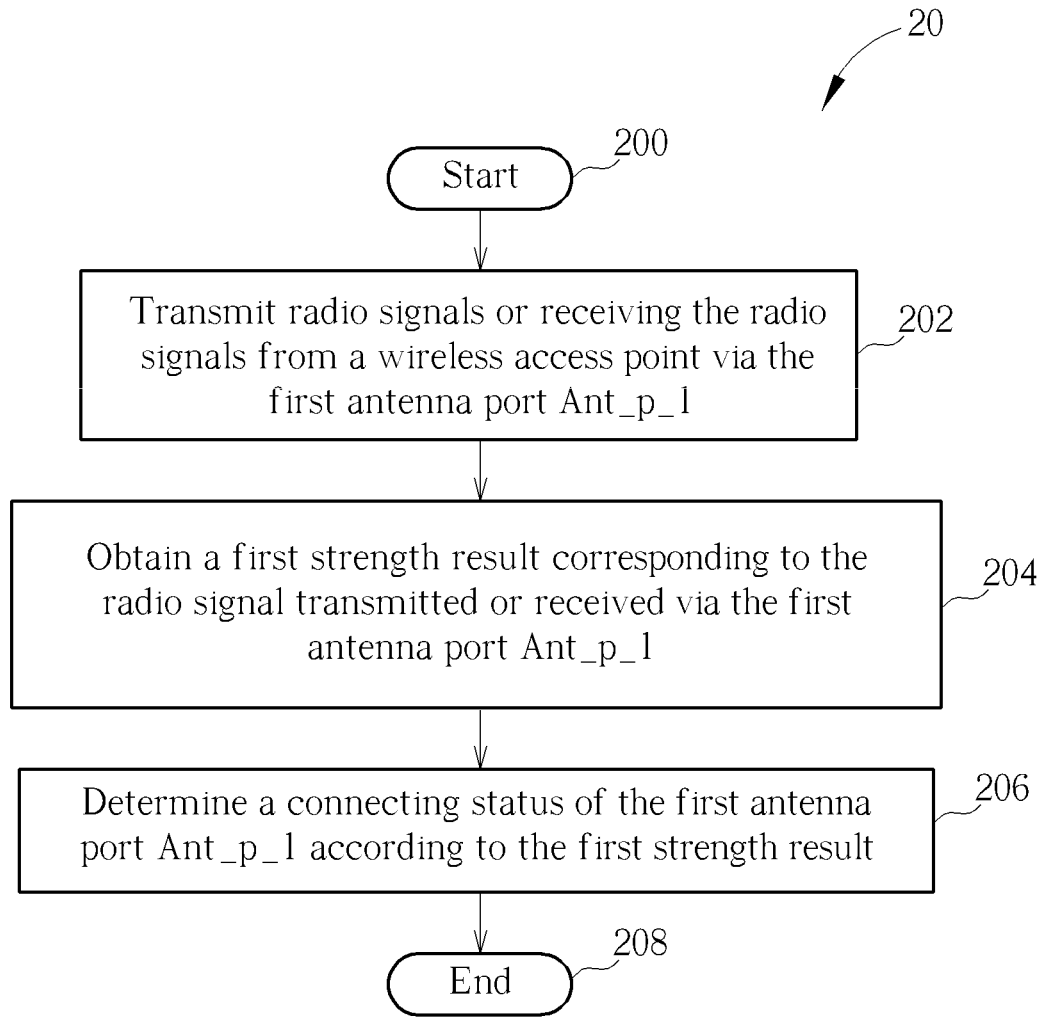
FIGS. 2 and 4-10 are flowchart diagrams of antenna deployment determination processes according to embodiments of the invention.

Please refer to FIG. 2, which is a flowchart diagram of an antenna deployment determination process 20 of the invention. Hereinafter, the antenna deployment determination process 20 mainly focuses on the wireless communication device 10 including a first antenna port Ant_p-1, which may also apply to the communication device 10' including only one antenna port Ant_p_1'. The antenna deployment determination process 20 can be compiled to the program code 112 stored in the storage unit 110 of the wireless communication device 10, and instructs the processing unit 100 to determine the condition of antenna deployment for the first antenna port Ant_p_1. The antenna deployment determination process 20 comprises the following steps:

Step 200: Start.

Step 202: Transmit radio signals or receiving the radio signals from a wireless access point via the first antenna port Ant_p_1.

Step 204: Obtain a first strength result corresponding to the radio signal transmitted or received via the first antenna port Ant_p_1.

Step 206: Determine a connecting status of the first antenna port Ant_p_1 according to the first strength result.

Step 208: End.

According to the process 20, when the wireless communication device 10 starts to determine a condition of antenna deployment corresponding to the first antenna port Ant_p_1, the wireless communication device 10 transmits or receives the radio signals via the first antenna port Ant_p_1, detects strength levels of the radio signals transmitted or received via the first antenna port Ant_p_1 to obtain the first strength result corresponding to the first antenna port Ant_p_1, and determines the connecting status of the first antenna port Ant_p_1 according to the first strength result. Detailed operations are narrated in the following based on transmission or reception the wireless communication device 10 is performed.

Transmission Mode with One Antenna Port

In detail, if the wireless communication device 10 is set to be the transmission mode, the processing unit 100 performs transmitting the radio signals via the first antenna port Ant_p_1. If the radio signals are not configured to send to a distinct receiving terminal (e.g. to a wireless access point), the radio signals may be configured to be broadcast. After transmitting the radio signals, according to the process 20, the processing unit 100 detects the strength levels of the radio signals transmitted via the first antenna port Ant_p_1, such that the first strength result corresponding to the first antenna port Ant_p_1 is obtained. Finally, the processing unit 100 determines a condition of antenna deployment by determining the connecting status of the first antenna port Ant_p_1 according to the first strength result.

Figure 3:
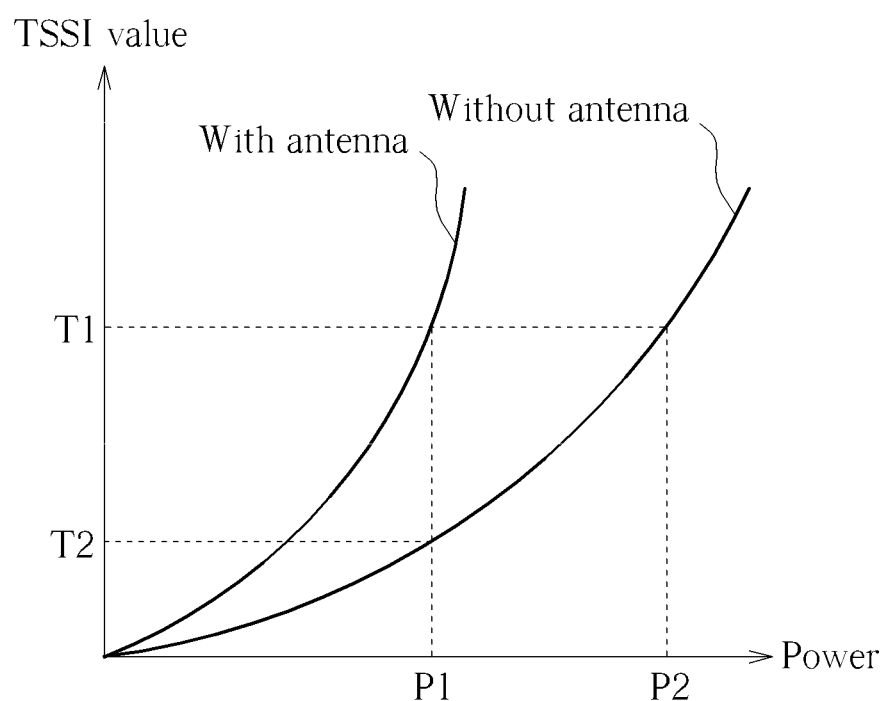
FIG. 3 is a graph showing a relationship between power of a transmitted radio signal and a detected TSSI value of the invention.

In the transmission mode, the first strength result may include transmitted signal strength indicator (TSSI) value corresponding to the first antenna port Ant_p_1, for the processing unit 100 to determine the connecting status. FIG. 3 shows a relationship between power of the transmitted radio signal set by the processing unit 100 and the TSSI value corresponding to the antenna port (e.g. Ant_p_1). Suppose the processing unit 100 provides fixed power P1 for transmitting a radio signal via the antenna port Ant_p_1, and the impedance of the antenna port Ant_p_1 matches the impedance of an antenna. If there exists no antenna that is attached to the antenna port Ant_p_1, the TSSI value T2 detected by the processing unit 100 is smaller than the TSSI value T1 which is the case including an antenna coupled to the antenna port Ant_p_1. Besides, the antenna port Ant_p_1 without the antenna needs more transmitting power (i.e. P2) to transmit the radio signal to achieve the same TSSI value T1.

Figure 4:
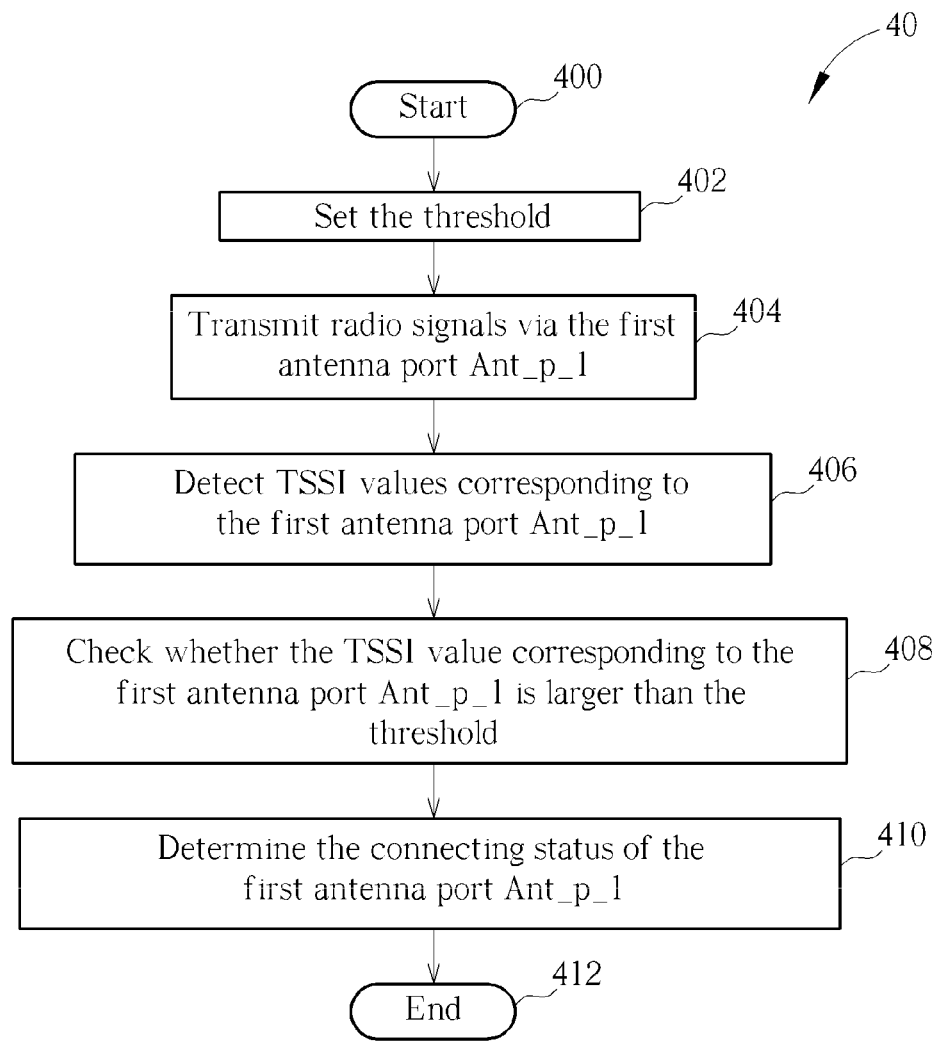

In one embodiment, a threshold is set for the processing unit 100 to determine a condition of antenna deployment for the first antenna port Ant_p_1 in the transmission mode. Please refer to FIG. 4, which is a flowchart diagram of an antenna deployment determination process 40 according to an embodiment of the invention. The antenna deployment determination process 40 is performed in the transmission mode. The antenna deployment determination process 40 can be compiled to the program code 112 stored in the storage unit 110 of the wireless communication device 10, and instructs the processing unit 100 to determine the condition of antenna deployment for the first antenna port Ant_p_1. The antenna deployment determination process 40 comprises the following steps:

Step 400: Start.

Step 402: Set the threshold.

Step 404: Transmit radio signals via the first antenna port Ant_p_1.

Step 406: Detect TSSI values corresponding to the first antenna port Ant_p_1.

Step 408: Check whether the TSSI value corresponding to the first antenna port Ant_p_1 is larger than the threshold.

Step 410: Determine the connecting status of the first antenna port Ant_p_1.

Step 412: End.

According to the antenna deployment determination process 40, when the wireless communication device 10 starts to determine a condition of antenna deployment corresponding to the first antenna port Ant_p_1, the wireless communication device 10 sets the threshold first, and then transmits the radio signals via the first antenna port Ant_p_1. After the radio signals are transmitted, the processing unit 100 detects the TSSI values corresponding to the first antenna port Ant_p_1, and checks whether the TSSI value is larger than the threshold. For example, if the detected TSSI value corresponding to the first antenna port Ant_p_1 is larger than the threshold, the processing unit 100 determines that an antenna is attached to the first antenna port Ant_p_1; otherwise, if the detected TSSI value corresponding to the antenna port Ant_p_1 is smaller than the threshold, the processing unit 100 determines that no antenna is attached to the antenna port Ant_p_1. Specifically, the threshold may be determined according to different conditions, e.g., antenna types or external environments. A plurality of predetermined thresholds may be set and stored in the storage unit 110 in advance, such that only one threshold can be selected from the plurality of predetermined thresholds for a specific condition.

Reception Mode with One Antenna Port

If the wireless communication device 10 is set to be the reception mode, the processing unit 100 performs receiving the radio signals via the first antenna port Ant_p_1. The radio signals from a wireless access point may be broadcast radio signals or sent to the wireless communication device 10. Alternatively, the radio signals may be sent to another destination while being used by the wireless communication device 10 by a sniffing method. After receiving the radio signals, the processing unit 100 detects strength levels of the radio signals received via the first antenna port Ant_p_1, such that the first strength result corresponding to the first antenna port Ant_p_1 is obtained. In the end, the processing unit 100 determines a condition of antenna deployment by determining the connecting status of the first antenna port Ant_p_1 according to the first strength result.

In the reception mode, the first strength result may include received signal strength indicator (RSSI) values corresponding to the first antenna port Ant_p_1 for the processing unit 100 to determine the connecting status of the first antenna port Ant_p_1. Assume power of the radio signals transmitted by the wireless access point are equal to the condition in the transmission mode to share the same principle that if there exists no antenna attached to an antenna port, the processing unit 100 detects smaller RSSI value than one another antenna port with an antenna attached.

Figure 5:
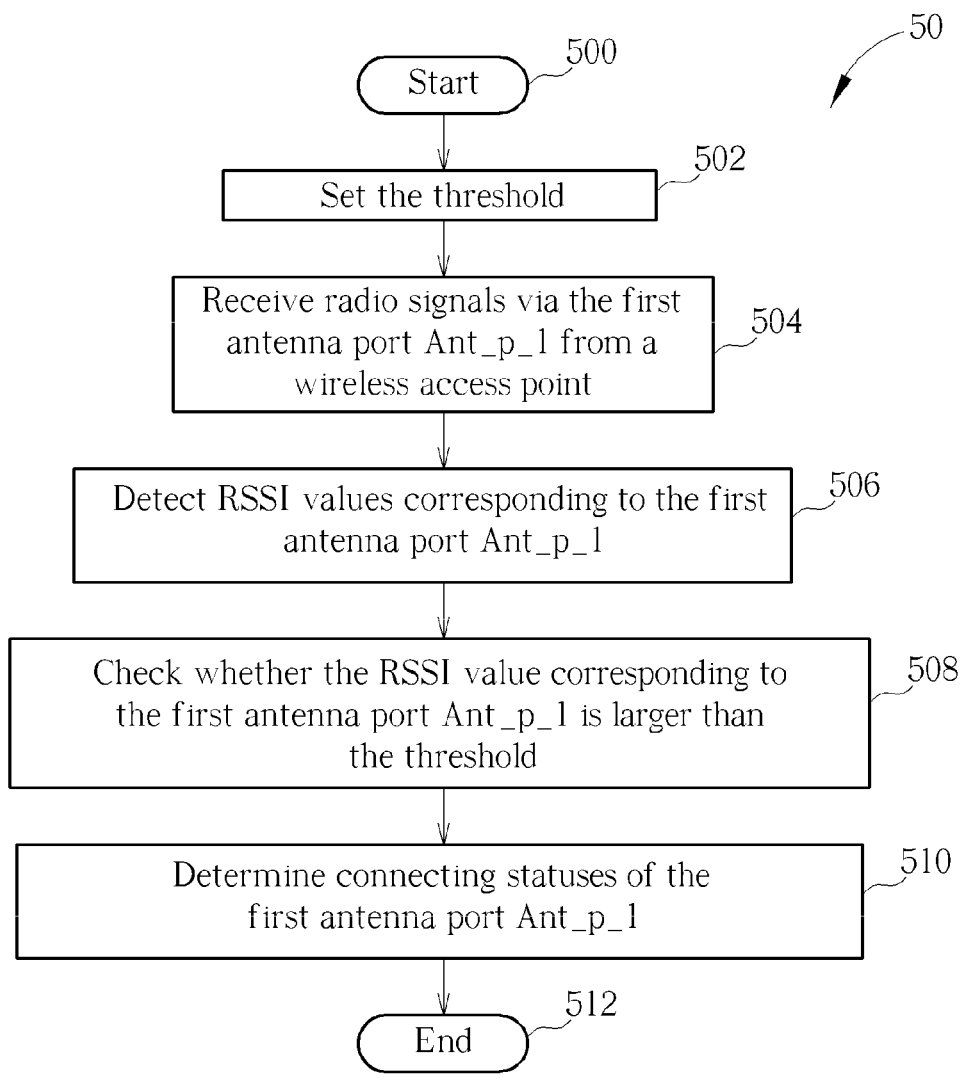

Furthermore, the antenna deployment determination process 40 can be modified to be performed in the reception mode as well. In one embodiment, another threshold is set for the processing unit 100 to determine the condition of antenna deployment for the first antenna port Ant_p_1 in the reception mode. Please refer to FIG. 5, which is a flowchart diagram of an antenna deployment determination process 50 according to an embodiment of the invention for the reception mode. The antenna deployment determination process 50 can be compiled to the program code 112 stored in the storage unit 110 of the wireless communication device 10, and instructs the processing unit 100 to determine the condition of antenna deployment for the first antenna port Ant_p_1. The antenna deployment determination process 50 comprises the following steps:

Step 500: Start.

Step 502: Set the threshold.

Step 504: Receive radio signals via the first antenna port Ant_p_1 from a wireless access point.

Step 506: Detect RSSI values corresponding to the first antenna port Ant_p_1.

Step 508: Check whether the RSSI value corresponding to the first antenna port Ant_p_1 is larger than the threshold.

Step 510: Determine connecting statuses of the first antenna port Ant_p_1.

Step 512: End.

In the antenna deployment determination process 50, the radio signals are received via the first antenna port Ant_p_1 from a wireless access point, and the TSSI values are replaced with the RSSI values, since the wireless communication device 10 is operated in the reception mode. In addition, the threshold utilized in the reception mode may be different from the threshold utilized in the transmission mode, and those skilled in the art can adaptively predetermine the threshold according to different requirements. Detailed step descriptions of the antenna deployment determination process 50 are similar to the steps of the antenna deployment determination process 40, which is therefore not given hereinafter.

By performing the antenna deployment determination processes 40 and 50 disclosed in the invention, the wireless communication device may be capable of determining the connecting status of existence of one antenna port, such that the wireless communication device may determine optimized scheme accordingly for wireless transceiving.

Figure 6:
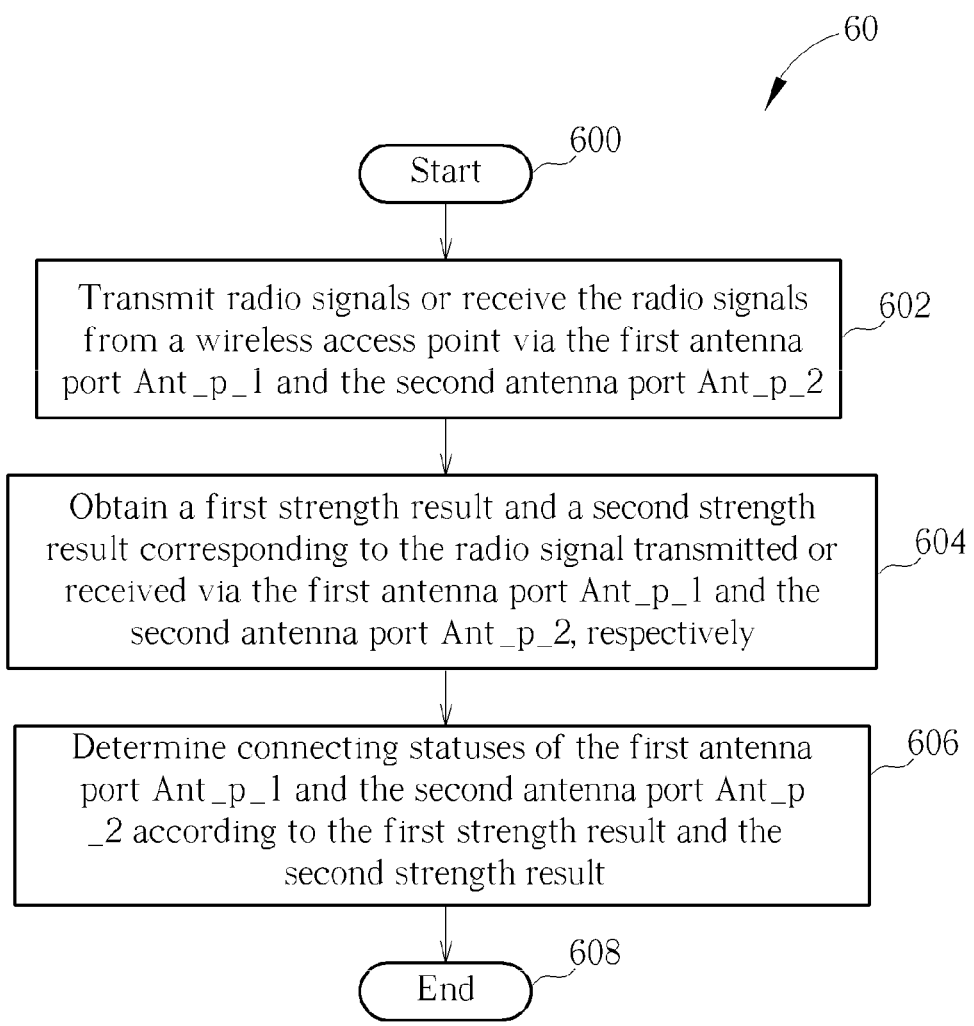

Furthermore, please refer to FIG. 6, which is a flowchart diagram of an antenna deployment determination processes 60 of the invention. Hereinafter, the antenna deployment determination process 60 mainly focuses on the wireless communication device 10 including the first antenna port Ant_p-1 and another second antenna port Ant_p-2. The antenna deployment determination processes 60 can be compiled to the program code 112 stored in the storage unit 110 of the wireless communication device 10, and instructs the processing unit 100 to determine a condition of antenna deployment for the first antenna port Ant_p_1 and the second antenna port Ant_p_2. The process 60 comprises the following steps:

Step 600: Start.

Step 602: Transmit radio signals or receive the radio signals from a wireless access point via the first antenna port Ant_p_1 and the second antenna port Ant_p_2.

Step 604: Obtain a first strength result and a second strength result corresponding to the radio signal transmitted or received via the first antenna port Ant_p_1 and the second antenna port Ant_p_2, respectively.

Step 606: Determine connecting statuses of the first antenna port Ant_p_1 and the second antenna port Ant_p_2 according to the first strength result and the second strength result.

Step 608: End.

The antenna deployment determination processes 60 is similar to the antenna deployment determination process 20, and the only difference is that the antenna deployment determination process 60 mainly discusses the wireless communication device 10 including the first antenna port Ant_p_1 and the second antenna port Ant_p_2. Accordingly, the radio signals are transmitted/received via the first antenna port Ant_p_1 and the second antenna port Ant_p_2, such that the first strength result of the first antenna port Ant_p_1 and the second strength result of the second antenna port Ant_p_2 are utilized to determine the connecting statuses of the first antenna port Ant_p_1 and the second antenna port Ant_p_2. Detailed operations are narrated in the following based on transmission or reception the wireless communication device 10 is performed. Certainly, those skilled in the art can adaptively modify the detailed steps of the antenna deployment determination process 60 to be applied to multiple antenna ports, which is also in the scope of the invention.

Transmission Mode with Two Antenna Ports

Similar to the circumstance of utilization one antenna port for transmission, the processing unit 100 performs transmitting the radio signals via the first antenna port Ant_p_1 and the second antenna port Ant_p_2. If the radio signals are not configured to send to a distinct receiving terminal (e.g. to a wireless access point), the radio signals may be configured to be broadcast. After transmitting the radio signals, the processing unit 100 detects the strength levels of the radio signals transmitted via the first antenna port Ant_p_1 and the second antenna port Ant_p_2, such that the first strength result and the second strength result corresponding to the first antenna port Ant_p_1 and the second antenna port Ant_p_2 are obtained, respectively. Accordingly, the processing unit 100 determines the condition of antenna deployment by determining the connecting statuses of the first antenna port Ant_p_1 and the second antenna port Ant_p_2 according to the first strength result and the second strength result. Also, the first strength result and the second strength result may include transmitted signal strength indicator (TSSI) values corresponding to the first antenna port Ant_p_1 and the second antenna port Ant_p_2, respectively, for the processing unit 100 to determine the connecting status.

Figure 7:
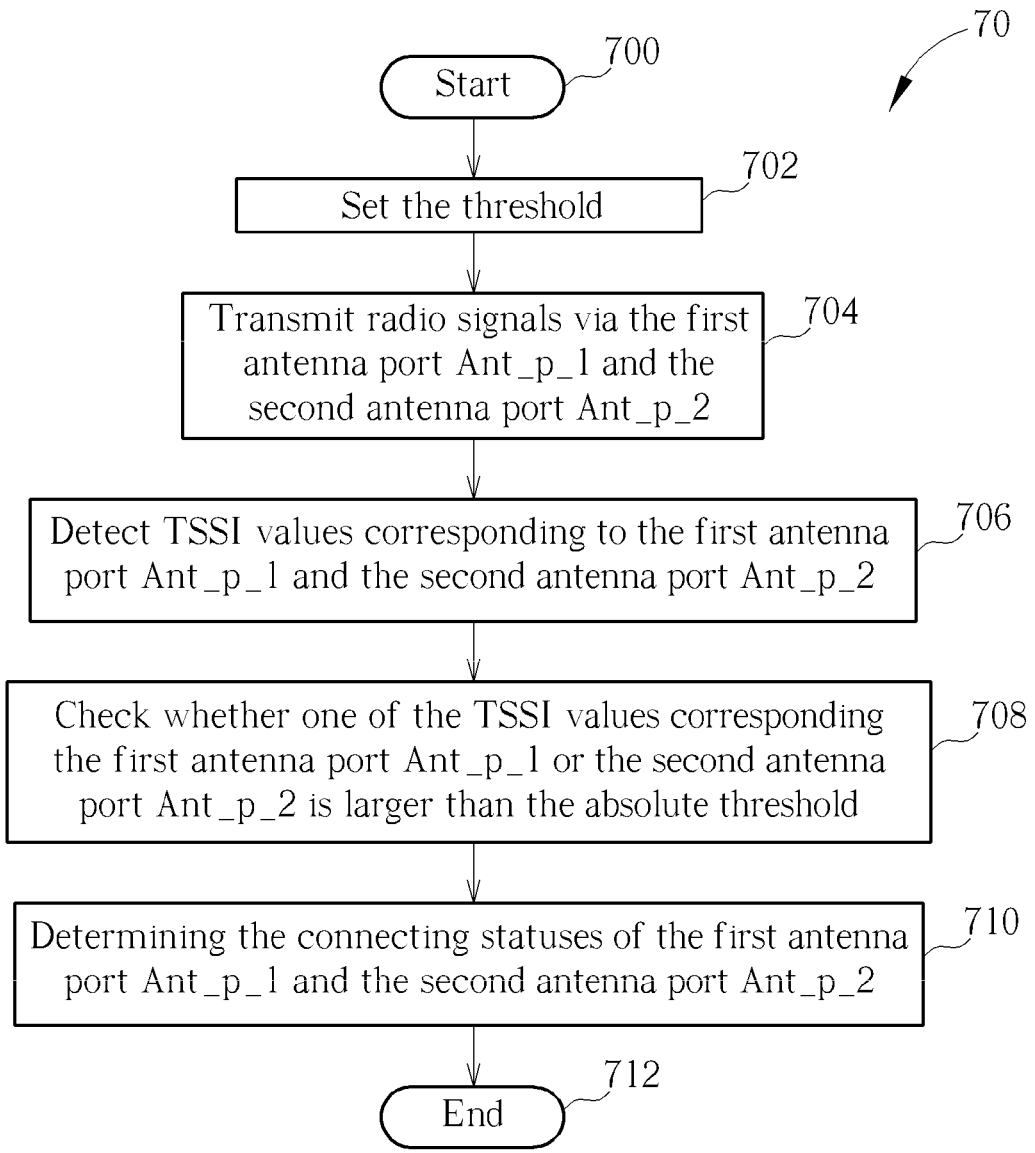

In one embodiment, another threshold is set for the processing unit 100 to determine the condition of antenna deployment for the first antenna port Ant_p_1 and the second antenna port Ant_p_2 in the transmission mode. Please refer to FIG. 7, which is a flowchart diagram of an antenna deployment determination process 70 according to an embodiment of the invention. The antenna deployment determination process 70 is performed in the transmission mode to be compiled to the program code 112 stored in the storage unit 110 of the wireless communication device 10, and instructs the processing unit 100 to determine the condition of antenna deployment for the first antenna port Ant_p_1 and the second antenna port Ant_p_2. The antenna deployment determination process 70 comprises the following steps:

Step 700: Start.

Step 702: Set the threshold.

Step 704: Transmit radio signals via the first antenna port Ant_p_1 and the second antenna port Ant_p_2.

Step 706: Detect TSSI values corresponding to the first antenna port Ant_p_1 and the second antenna port Ant_p_2.

Step 708: Check whether one of the TSSI values corresponding the first antenna port Ant_p_1 or the second antenna port Ant_p_2 is larger than the absolute threshold.

Step 710: Determining the connecting statuses of the first antenna port Ant_p_1 and the second antenna port Ant_p_2.

Step 712: End.

The antenna deployment determination process 70 is similar to the antenna deployment determination process 40. The only difference is that the antenna deployment determination process 70 is utilized for the first antenna port Ant_p_1 and the second antenna port Ant_p_2. After the radio signals are transmitted, the processing unit 100 detects at least two the TSSI values corresponding to the first antenna port Ant_p_1 and the second antenna port Ant_p_2, and accordingly, checks whether each TSSI value is larger than the threshold. For example, if the detected TSSI value corresponding to the antenna port Ant_p_1 is larger than the threshold, the processing unit 100 determines that an antenna is attached to the antenna port Ant_p_1; otherwise, if the detected TSSI value corresponding to the antenna port Ant_p_1 is smaller than the absolute threshold, the processing unit 100 determines that no antenna is attached to the antenna port Ant_p_1. By continuously executing Step 708 for the other antenna port Ant_p_2, the connecting statuses of the first antenna port Ant_p_1 and the second antenna port Ant_p_2 can be determined. Specifically, the threshold may be determined according to different conditions, e.g., antenna types or external environments, which is no limiting to the scope of the invention. Also, a plurality of predetermined thresholds may be set and stored in the storage unit 110 in advance for adaptive selection. Certainly, those skilled in the art can adaptively modify the detailed steps of the processes 70 with additional thresholds to be applied to multiple antenna ports, which is also in the scope of the invention.

Figure 8:
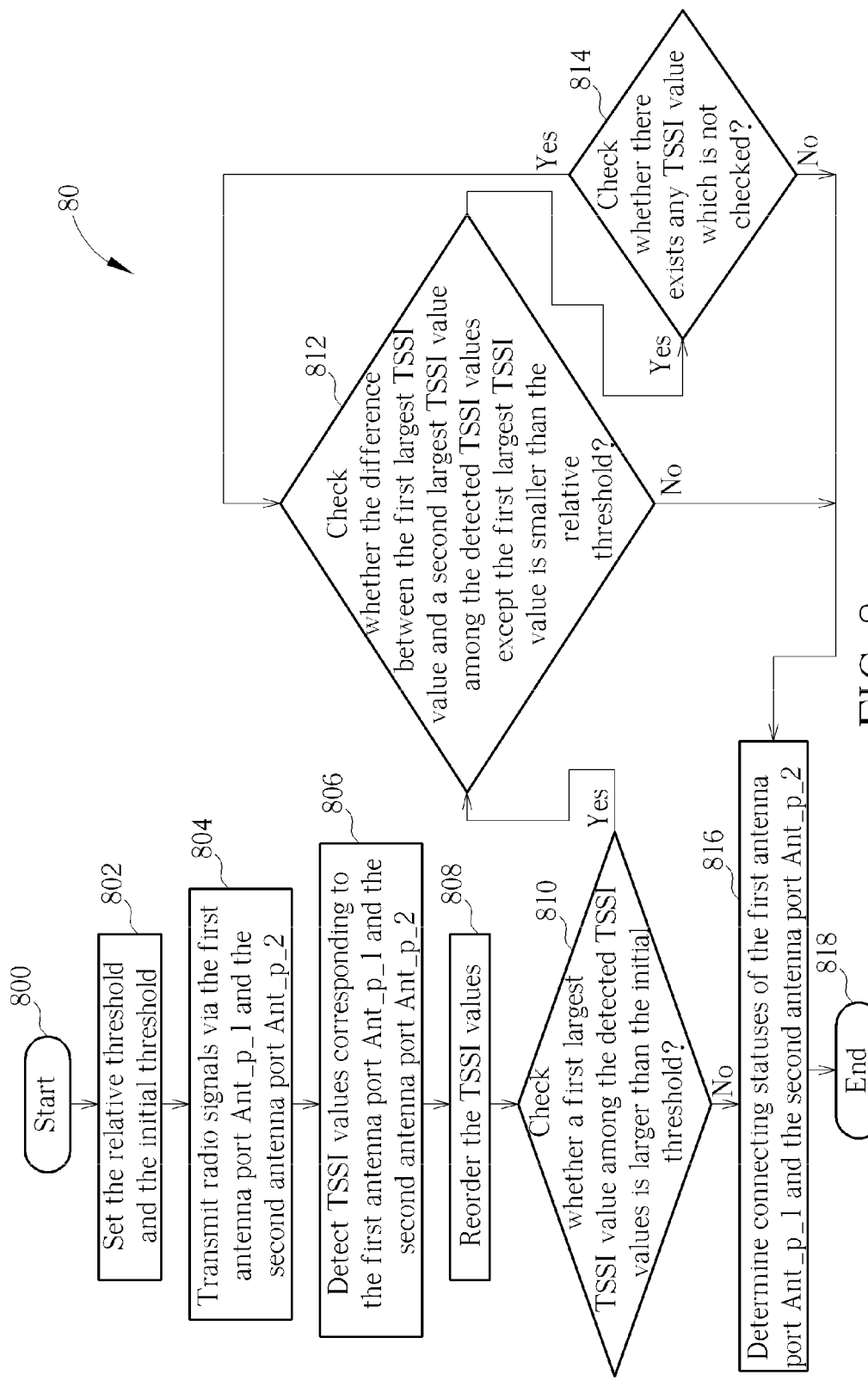

In one embodiment, an initial threshold and a relative threshold are set for the processing unit 100 to determine a condition of antenna deployment for the first antenna port Ant_p_1 and the second antenna port Ant_p_2 in the transmission mode. Preferably, the initial threshold and the relative threshold can be derived from the threshold in the above embodiments to represent a comparison value in the embodiment, which is not limiting the scope of the invention. Please refer to FIG. 8, which is an exemplary flowchart diagram of an antenna deployment determination process 80 of the invention. The antenna deployment determination process 80 is performed in the transmission mode to be compiled to the program code 112 stored in the storage unit 110 of the wireless communication device 10, and instructs the processing unit 100 to determine the condition of antenna deployment for the first antenna port Ant_p_1 and the second antenna port Ant_p_2. The antenna deployment determination process 80 comprises the following steps:

Step 800: Start.

Step 802: Set the relative threshold and the initial threshold.

Step 804: Transmit radio signals via the first antenna port Ant_p_1 and the second antenna port Ant_p_2.

Step 806: Detect TSSI values corresponding to the first antenna port Ant_p_1 and the second antenna port Ant_p_2.

Step 808: Reorder the TSSI values.

Step 810: Check whether a first largest TSSI value among the detected TSSI values is larger than the initial threshold. If yes, go to Step 812; otherwise, go to Step 816.

Step 812: Check whether the difference between the first largest TSSI value and a second largest TSSI value among the detected TSSI values except the first largest TSSI value is smaller than the relative threshold. If yes, go to Step 814; otherwise, go to Step 816.

Step 814: Check whether there exists any TSSI value which is not checked. If yes, go to Step 812; otherwise, go to Step 816.

Step 816: Determine connecting statuses of the first antenna port Ant_p_1 and the second antenna port Ant_p_2.

Step 818: End.

According to the antenna deployment determination process 80, when the wireless communication device 10 starts to determine the condition of antenna deployment corresponding to the first antenna port Ant_p_1 and the second antenna port Ant_p_2, the wireless communication device 10 sets the relative threshold and the initial threshold first, then transmits the radio signals via the first antenna port Ant_p_1 and the second antenna port Ant_p_2. After the radio signals are transmitted, the processing unit 100 detects the TSSI values corresponding to the first antenna port Ant_p_1 and the second antenna port Ant_p_2 and reorders the TSSI values.

Referring to the TSSI values, the processing unit 110 checks whether a first largest TSSI value among the TSSI values is larger than the initial threshold. If the first largest TSSI value is not larger than the initial threshold, the processing unit 100 determines that no antenna is attached to the first antenna port Ant_p_1 and the second antenna port Ant_p_2. Otherwise, if the first largest TSSI value is larger than the initial threshold, the processing unit 100 determines that an antenna is attached to an antenna port corresponding the first largest TSSI value, e.g. Ant_p_1, and then checks whether the difference between the first largest TSSI value and a second largest TSSI value (i.e. the largest TSSI value among the TSSI values except the first largest TSSI value) is smaller than the relative threshold. If the difference between the first largest TSSI value and the second largest TSSI value is smaller than the relative threshold, the processing unit 100 determines that an antenna is attached to an antenna port corresponding to the second largest TSSI value, e.g. Ant_p_2. If the difference between the first largest TSSI value and the second largest TSSI value is larger than the relative threshold, the processing unit 100 determines that an antenna is attached to the antenna port corresponding to the first largest TSSI value (i.e. Ant_p_1) and no antenna is attached to the antenna port corresponding to the second largest TSSI value (i.e. Ant_p_2). Accordingly, the connecting statuses of the first antenna port Ant_p_1 and the second antenna port Ant_p_2 can be determined via the processing unit 100 according the comparison between the first largest TSSI value, the second largest TSSI as well as the relative threshold and the initial threshold. Besides, if more antenna ports are existed, the processing unit 110 may continue to check whether the difference between the first largest TSSI value and a third largest TSSI value (i.e. the largest TSSI value among the TSSI values except the first and second largest TSSI values) is smaller than the relative threshold, so as to apply the embodiment for multiple ports, which is also in the scope of the invention. Similarly, the initial/relative threshold may be determined according to different conditions, e.g., antenna types or external environments, and a plurality of predetermined initial/relative thresholds may be set and stored in the storage unit 110 in advance for adaptive selection. Certainly, those skilled in the art can adaptively add/modify other operations/thresholds for the antenna deployment determination process 80 to be applied for multiple antenna ports, which is also in the scope of the invention.

Note that, if the TSSI values corresponding to the first antenna port Ant_p_1 and the second antenna port Ant_p_2 are all zero, the processing unit 100 takes further actions, such as re-performing antenna deployment determination process again and notifying that an unusual condition happens, which can be applied to multiple antenna ports with the corresponding TSSI values being zero as well.

Reception Mode with Two Antenna Ports

Similar to the circumstance of utilization one antenna port for transmission, the processing unit 100 performs receiving the radio signals via the first antenna port Ant_p_1 and the second antenna port Ant_p_2. The radio signals from a wireless access point may be broadcast radio signals or sent to the wireless communication device 10. Alternatively, the radio signals may be sent to another destination while being used by the wireless communication device 10 by a sniffing method. After receiving the radio signals, the processing unit 100 detects strength levels of the radio signals received via the first antenna port Ant_p_1 and the second antenna port Ant_p_2, such that the first strength result and the second strength result corresponding to the first antenna port Ant_p_1 and the second antenna port Ant_p_2 are obtained. In the end, the processing unit 100 determines the condition of antenna deployment by determining the connecting statuses of the first antenna port Ant_p_1 and the second antenna port Ant_p_2 according to the first strength result and the second strength result. Also, the first strength result and the second strength result may include received signal strength indicator (RSSI) values corresponding to the first antenna port Ant_p_1 and the second antenna port Ant_p_2, so as to modify the antenna deployment determination process 70 for the reception mode in the following paragraph.

Figure 9:
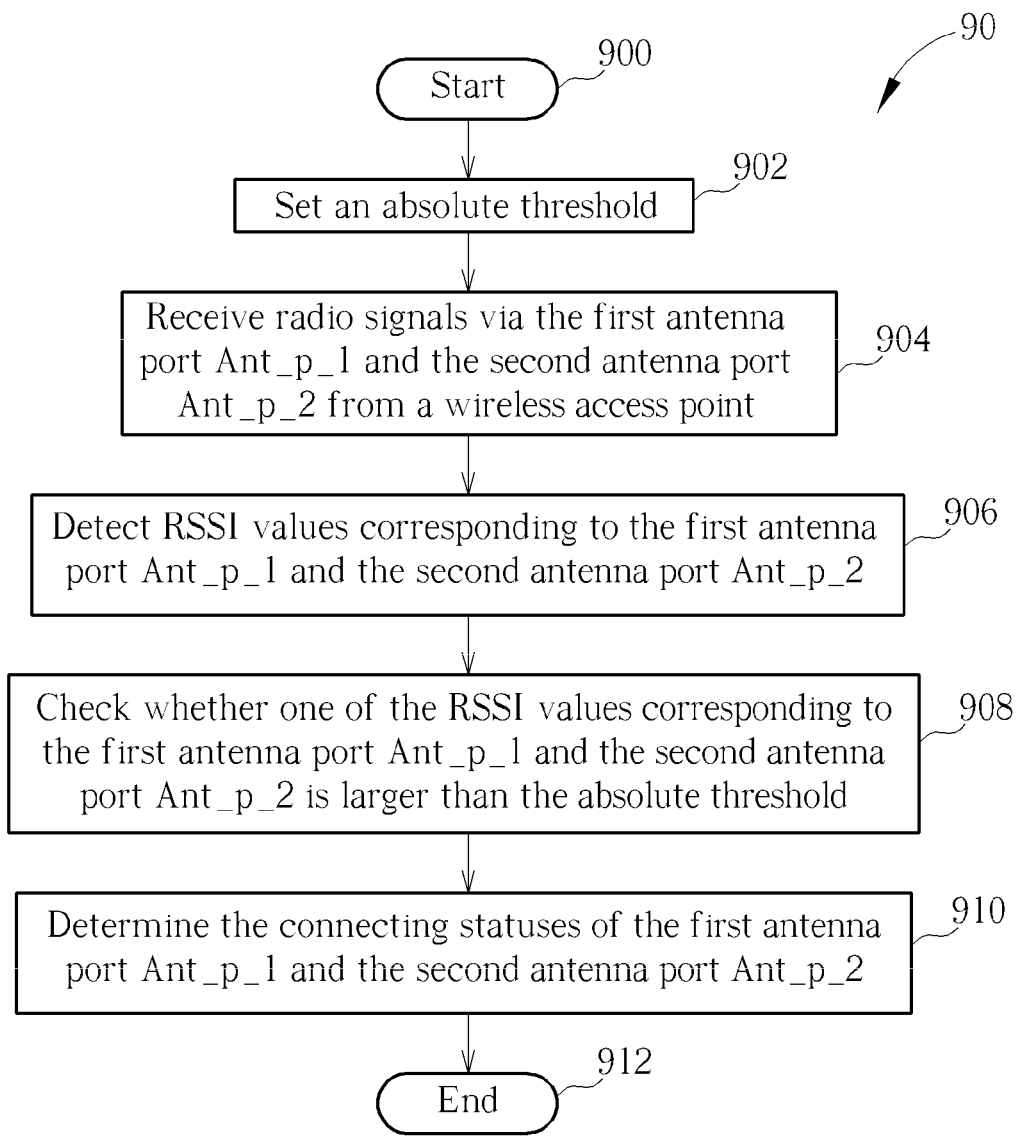

In one embodiment, another threshold is set for the processing unit 100 to determine a condition of antenna deployment for the first antenna port Ant_p_1 and the second antenna port Ant_p_2 in the reception mode. Please refer to FIG. 9, which is a flowchart diagram of an antenna deployment determination process 90 according to an embodiment of the invention. The antenna deployment determination process 90 is performed in the reception mode to be compiled to the program code 112 stored in the storage unit 110 of the wireless communication device 10, and instructs the processing unit 100 to determine the condition of antenna deployment for the first antenna port Ant_p_1 and the second antenna port Ant_p_2. The antenna deployment determination process 90 comprises the following steps:

Step 900: Start.

Step 902: Set the threshold.

Step 904: Receive radio signals via the first antenna port Ant_p_1 and the second antenna port Ant_p_2 from a wireless access point.

Step 906: Detect RSSI values corresponding to the first antenna port Ant_p_1 and the second antenna port Ant_p_2.

Step 908: Check whether one of the RSSI values corresponding to the first antenna port Ant_p_1 and the second antenna port Ant_p_2 is larger than the absolute threshold.

Step 910: Determine the connecting statuses of the first antenna port Ant_p_1 and the second antenna port Ant_p_2.

Step 912: End.

Figure 10:
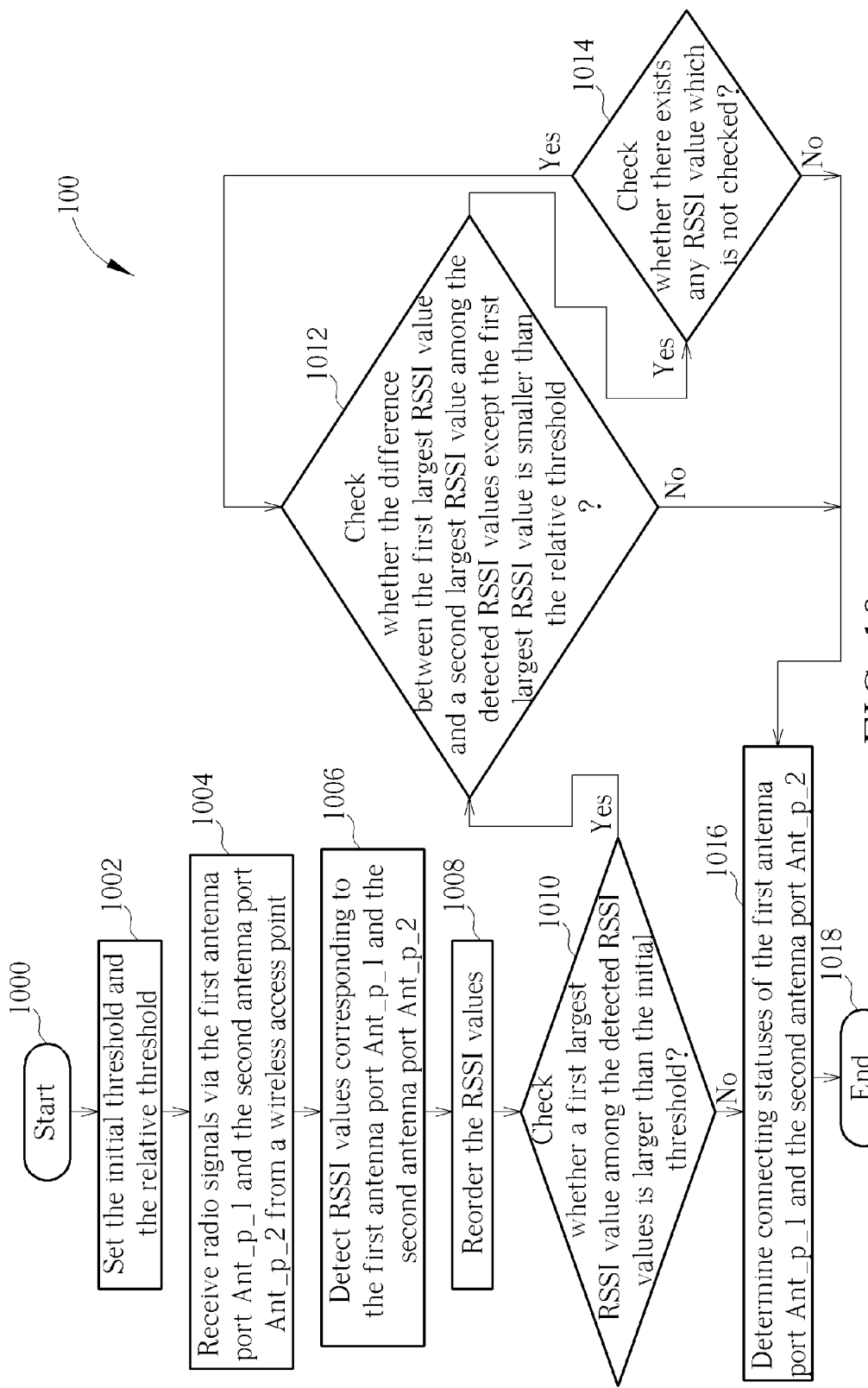

Similar to the embodiment for the antenna deployment determination process 80, the initial threshold and the relative threshold, derived from the threshold in the above embodiments to represent a comparison value in the embodiment, are set for the processing unit 100 to determine the condition of antenna deployment for the first antenna port Ant_p_1 and the second antenna port Ant_p_2 in the reception mode. Please refer to FIG. 10, which is an exemplary flowchart diagram of an antenna deployment determination process 92 of the invention. The antenna deployment determination process 92 is performed in the reception mode to be compiled to the program code 112 stored in the storage unit 110 of the wireless communication device 10, and instructs the processing unit 100 to determine the condition of antenna deployment for the first antenna port Ant_p_1 and the second antenna port Ant_p_2. The antenna deployment determination process 92 comprises the following steps:

Step 1000: Start.

Step 1002: Set the initial threshold and the relative threshold.

Step 1004: Receive radio signals via the first antenna port Ant_p_1 and the second antenna port Ant_p_2 from a wireless access point.

Step 1006: Detect RSSI values corresponding to the first antenna port Ant_p_1 and the second antenna port Ant_p_2.

Step 1008: Reorder the RSSI values.

Step 1010: Check whether a first largest RSSI value among the detected RSSI values is larger than the initial threshold. If yes, go to Step 1012; otherwise, go to Step 1016.

Step 1012: Check whether the difference between the first largest RSSI value and a second largest RSSI value among the detected RSSI values except the first largest RSSI value is smaller than the relative threshold. If yes, go to Step 1014; otherwise, go to Step 1016.

Step 1014: Check whether there exists any RSSI value which is not checked. If yes, go to Step 1012; otherwise, go to Step 1016.

Step 1016: Determine connecting statuses of the first antenna port Ant_p_1 and the second antenna port Ant_p_2.

Step 1018: End.

Similar to the embodiment for the antenna deployment determination process 80, processing unit 100 determines the connecting statuses of the first antenna port Ant_p_1 and the second antenna port Ant_p_2 according the comparison between the first largest RSSI value, the second largest RSSI value as well as the relative threshold and the initial threshold. Besides, if more antenna ports are existed, the processing unit 110 may continue to check whether the difference between the first largest RSSI value and a third largest RSSI value is smaller than the relative threshold, so as to apply the embodiment for multiple ports. Certainly, those skilled in the art can adaptively add/modify other operations/thresholds for the antenna deployment determination process 92 to be applied for multiple antenna ports, which is also in the scope of the invention.

By performing the antenna deployment determination processes 60, 70, 80, 90 and 92 disclosed in the invention, the wireless communication device is capable of determining the connecting status for multiple antenna ports, such that the wireless communication device may determine optimized scheme accordingly for wireless transceiving.

Additionally, users of the invention can adaptively combine more than one wireless communication devices to increase the calculation efficiency, and the storage unit 110 of the wireless communication device 10 can predetermine separate/different programming codes corresponding to antenna deployment determination processes 20, 40, 50, 60,

70, 80, 90 and 92, respectively, so as to reduce calculation periods of each process, which is also in the scope of the invention.

To sum up, according to the methods disclosed in the invention, a wireless communication device can determine a connecting status of antenna ports by software method, which is efficient and cost-effective.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of antenna deployment determination in a wireless communication device, the method comprising:
   transceiving a radio signal via a first antenna port of the wireless communication device;
   obtaining a first strength result corresponding to the radio signal transmitted or received via the first antenna port;
   comparing the first strength result with a first threshold;
   determining whether an antenna is connected to the first antenna port according to the compared result;
   transceiving the radio signal via a second antenna port of the wireless communication device;
   obtaining a second strength result corresponding to the radio signal transmitted or received via the second antenna port; and
   comparing a difference between the first strength result and the second strength result with a second threshold to determine whether another antenna is connected to the second antenna port.

2. The method of claim 1, wherein the step of transceiving the radio signal via the first antenna port of the wireless communication device comprises transmitting the radio signal via the first antenna port.

3. The method of claim 2, wherein the first strength result comprises a transmitted signal strength indicator (TSSI) value.

4. The method of claim 1, wherein the step of transceiving the radio signal via the first antenna port of the wireless communication device comprises receiving the radio signal via the first antenna port.

5. The method of claim 4, wherein the radio signal is sent from a wireless access point.

6. The method of claim 4, wherein the first strength result comprises a received signal strength indicator (RSSI) value.

7. A method of antenna deployment determination in a wireless communication device, the method comprising:
   transceiving a radio signal via a first antenna port of the wireless communication device;
   obtaining a first strength result corresponding to the radio signal transmitted or received via the first antenna port;
   comparing the first strength result with a first threshold;
   determining an antenna is connected to the first antenna port according to the compared result;
   transceiving the radio signal via a second antenna port of the wireless communication device;
   obtaining a second strength result corresponding to the radio signal transmitted or received via the second antenna port, wherein the first strength result is larger than the second strength result; and
   comparing a difference between the first strength result and the second strength result with a second threshold to determine whether another antenna is connected to the second antenna port.

8. A wireless communication device, comprising:
   a first antenna port;
   a second antenna port;
   a processing unit, for executing a program code; and
   a data storage unit, for storing the program code;
   wherein the program code instructs the processing unit to execute the following steps:
     transceiving a radio signal via the first antenna port;
     obtaining a first strength result corresponding to the radio signal transmitted or received via the first antenna port;
     comparing the first strength result with a first threshold;
     determining whether an antenna is connected to the first antenna port according to the compared result;
     transceiving the radio signal via the second antenna port;
     obtaining a second strength result corresponding to the radio signal transmitted or received via the second antenna port; and
     comparing a difference between the first strength result and the second strength result with a second threshold to determine whether another antenna is connected to the second antenna port.

9. The wireless communication device of claim 8, wherein the step of transceiving the radio signal via the first antenna port further comprises transmitting the radio signal via the first antenna port.

10. The wireless communication device of claim 9, wherein the first strength result comprises a transmitted signal strength indicator (TSSI) value.

11. The wireless communication device of claim 8, wherein the step of transceiving of the radio signal via the first antenna port further comprises receiving the radio signal via the first antenna port.

12. The wireless communication device of claim 11, wherein the radio signal is sent from a wireless access point.

13. The wireless communication device of claim 11, wherein the first strength result comprises a received signal strength indicator (RSSI) value.

14. A wireless communication device, comprising:
   a first antenna port;
   a second antenna port;
   a processing unit, for executing a program code; and
   a data storage unit, for storing the program code;
   wherein the program code instructs the processing unit to execute the following steps:
     transceiving a radio signal via the first antenna port;
     obtaining a first strength result corresponding to the radio signal transmitted or received via the first antenna port;
     comparing the first strength result with a first threshold;
     determining an antenna is connected to the first antenna port according to the compared result;
     transceiving the radio signal via the second antenna port;
     obtaining a second strength result corresponding to the radio signal transmitted or received via the second antenna port, wherein the first strength result is larger than the second strength result; and
   comparing a difference between the first strength result and the second strength result with a second threshold to determine whether another antenna is connected to the second antenna port.

* * * * *